July 17, 1928.
J. McEWAN
1,677,593
COOKING UTENSIL
Filed Aug. 27, 1927
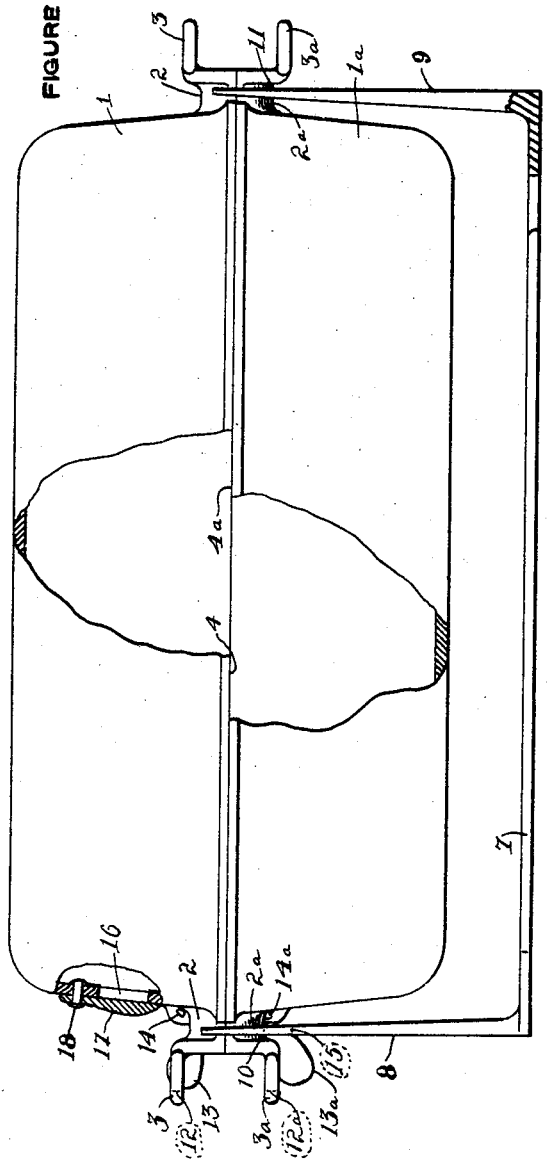
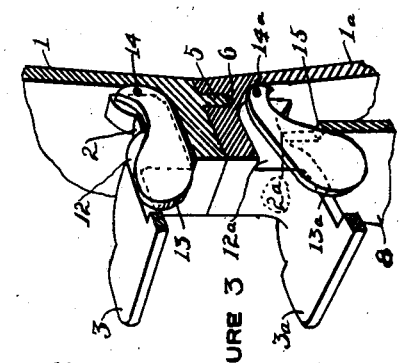
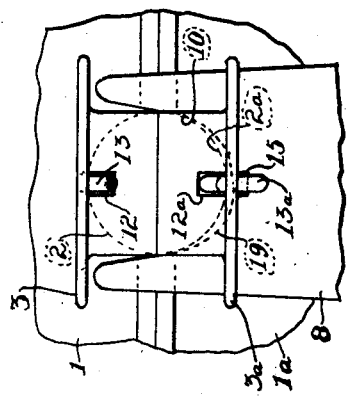
INVENTOR
James McEwan
John A. Naismith
ATTORNEY Patented July 17, 1928.

UNITED STATES PATENT OFFICE.

JAMES McEWAN, OF PALO ALTO, CALIFORNIA.

COOKING UTENSIL.

Application filed August 27, 1927. Serial No. 215,860.

This invention relates particularly to that type of cooking utensils used for roasting, baking or broiling foods.

It is one object of the invention to provide a device of the character indicated that may be used with high efficiency either in an oven, or over an open fire or other suitable heating means.

It is another object of the invention to provide a device of the character indicated so constructed and arranged that the food being cooked therein may be quickly and easily inverted without being uncovered and exposed to the cooling atmosphere.

It is still another object of the invention to provide a device of the character indicated revolubly mounted on a suitable standard and provided with releasable means for securing it in a given position.

Finally, it is an object of the invention to provide a cooking utensil of the character indicated that will be simple in form and construction, economical to manufacture, easily assembled and operated, and highly efficient in its practical application.

In the drawing:

Figure 1 is a side elevation of a device embodying my invention, part broken away, and partly in section.

Figure 2 is an enlarged end view of a portion of the structure shown in Figure 1.

Figure 3 is a perspective illustration of a portion of the device showing the fastening means, partly in section.

Referring now more particularly to the drawing, I show at 1—1ª two roaster pans identical in form, size and construction (except as to the vent hereinafter described). Since these two elements are the same in construction but one will be described in detail, and the corresponding parts on the other element will be designated by similar reference numerals followed by the letter "a."

The pan 1 is made of any suitable material and of any suitable size and conformation. Extending from each end of the pan is a semi-circular trunnion 2 having a finger plate 3 formed thereon and extending outwardly therefrom in a plane parallel with the plane of the open edge of the pan. The axis about which this half-trunnion rotates extends longitudinally of the pan and lies in the plane of the outer surface of the open side of the pan.

The result of this construction is, that when the two pans 1—1ª are brought together with their opposing edges 4—4ª in contact a closed receptacle is provided with a trunnion on each end provided with opposed plates by means of which the receptacle may be rotated when mounted in a suitable bearing. The two pans are held in accurate registration with each other by means of interengaging pin and socket devices 5—6.

The support for the receptacle in the present case consists of a cast metal base ring 7 having a bearing member formed on each end as at 8 and 9 in which the trunnions are journaled as at 10 and 11.

It is of course necessary that some means be provided for preventing rotation of the receptacle except when desired during the roasting process. To accomplish this end I form a slot 12 in one trunnion portion 2 and plate 3 in radial relation to the axis about which the trunnion rotates and in this slot I mount a dog 13 on a pivot as 14. I also form a notch as 15 in the bearing in which the trunnion is journaled. When the receptacle is rotated a distance the dog 13 or 13ª as the case may be drops into the notch 15 and effectually prevents further rotation of the receptacle. By lifting the dog out of the notch the receptacle may be again rotated as desired.

A vent for the receptacle is provided by forming an orifice therein as at 16, and pivotally mounting a plate 17 over the orifice as at 18. The vent may be opened or closed by swinging the plate 17 on its pivot 18.

It may now be seen that I have provided a receptacle that may be used as a roaster in an oven or over an open fire, as a gas flame. The roast in the receptacle may be turned over as often as desired by merely rotating the receptacle on its trunnions, the engaging opposed edges of the two pans 1—1ª being sufficiently exact to prevent leakage of liquid therebetween. The act of turning the receptacle by grasping the opposing finger plates 3—3ª assists in maintaining close contact between the two pans, and this close contact is still further assured by making the bearings for the trunnions somewhat egg-shaped as indicated at 19 so that the said trunnions have actual contact with the bearings at two points only, and these on diametrically opposite parts. By means of this arrangement the weight of the receptacle itself is used to urge the opposing edges together. While the plates 3—3ª are referred to as finger plates for use in turning the receptacle, it is pointed out that they also function as handles by means of which the receptacle may be lifted as occasion may require.

It is to be understood, of course, that while I have herein shown and described but one specific embodiment of the invention, changes in form, construction, and method of assembly and operation may be made within the scope of the appended claims.

I claim:

1. A device of the character described, comprising a pair of pans arranged in opposed relation to each other to form a closed receptacle, opposed complementary trunnion portions mounted on the pans, opposed and spaced finger plates mounted on the trunnion portions, detent members mounted in the opposed trunnion portions and finger plates, and supports for the said trunnions provided with means for engaging the detent members.

2. A device of the character described, comprising a pair of pans arranged in opposed relation to each other to form a closed receptacle, opposed complementary trunnion portions mounted on each end of the pans, a support having spaced upwardly diverging sockets formed therein to receive said trunnions and to clamp the opposed complimentary portions thereof together during rotation of the trunnions, and means whereby the trunnions may be rotated in the sockets.

3. A device of the character described, comprising a pair of pans arranged in opposed relation to each other to form a closed receptacle, opposed complementary trunnion portions mounted on each end of the pans, a support having spaced sockets formed therein to receive said trunnions, one socket having a notch formed therein, and a pair of opposed detents pivotally mounted on opposed trunnion portions and adapted to engage the said socket when the trunnion is rotated.

JAMES McEWAN.